(12) United States Patent
Abrell et al.

(10) Patent No.: US 6,227,239 B1
(45) Date of Patent: May 8, 2001

(54) SPRING-LOADED SAFETY VALVE

(75) Inventors: Monika Abrell, München (DE); Olaf Hunger, Schaffhausen (CH); Jörg Peter, Hinwil (CH); Lukas Zehnder, Baden-Dättwil (CH); Christian Dähler, Farmington, CT (US)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/471,130

(22) Filed: Dec. 23, 1999

(30) Foreign Application Priority Data

Dec. 29, 1998 (DE) ................................. 198 60 578

(51) Int. Cl.⁷ ..................................................... F16K 17/04
(52) U.S. Cl. ........................... 137/529; 137/531; 137/535; 137/537
(58) Field of Search .................................. 137/529, 531, 137/535, 537

(56) References Cited

U.S. PATENT DOCUMENTS

| | | | | |
|---|---|---|---|---|
| 1,152,114 | * | 8/1915 | Luitwieler | 137/529 |
| 1,716,832 | * | 1/1929 | Odend'hal | 137/531 |
| 4,201,242 | * | 5/1980 | Troxell, Jr. | 137/531 |

FOREIGN PATENT DOCUMENTS 161796  7/1905 (DE) .

OTHER PUBLICATIONS

Hildebrand, S, "Feinmechanische Bauelemente", VEB Verlag Technik Berlin, 4th edition, 1980, pp. 677–679.

* cited by examiner

*Primary Examiner*—Michael Buiz
*Assistant Examiner*—Ramesh Krishnamurthy
(74) *Attorney, Agent, or Firm*—Burns, Doane, Swecker & Mathis, L.L.P.

(57) ABSTRACT

An automatically resetting safety valve for a generator circuit breaker is to open rapidly and wide, even if the pressure applied to a valve-closing body (1) does not increase substantially over a valve stroke (a) or even falls. In order to ensure this, a valve-closing-body joint (10) of the valve-closing body (1) via a first closing-body lever (H1) and via a first sliding joint (3), is connected in an articulated manner to a first support lever (H2), which is rotatably mounted in a first support lever joint (4) fastened to a lever wall (5). The first sliding joint (3), via a first compression spring (8), is in compressive connection with a spring wall joint (7) fastened to a spring wall (6). The valve-closing body (1) is movable along a plain-bearing axis (A). First and second closing-body levers (H1, H1') and first and second support levers (H2, H2'), which are arranged in mirror image relative to the plain-bearing axis (A) of the valve-closing body (1), may be provided. Instead of an outer compression spring (8), an inner tension spring (9) may be provided.

6 Claims, 2 Drawing Sheets

SPRING-LOADED SAFETY VALVE

FIELD OF THE INVENTION

The invention relates to a spring-loaded safety valve.

BACKGROUND OF THE INVENTION

The textbook by Prof. Dr.-Ing. Siegfried Hildebrand: "Feinmechanische Bauelement", VEB Verlag Technik Berlin, 4th edition, 1980, pages 677 describes centrifugal-braking-force regulators which have lever-mounted centrifugal weights and in which the centrifugal force acts against the resetting force of a compression spring arranged axially relative to the stroke axis. The effectiveness of the regulator starts from a limit speed at which the braking surfaces are just in contact. The spring force increases with increasing stroke.

An automatically resetting safety valve requires rapid opening on the one hand and wide opening on the other hand, even if the valve-opening force, after reaching a release force, does not increase substantially over the stroke of the valve or even decreases.

SUMMARY OF THE INVENTION

The invention, achieves the object of developing a spring-loaded safety valve of the type mentioned above in such a way that wide opening of the valve, after reaching a predeterminable valve-opening force, is also ensured when the latter subsequently does not increase.

In accordance with the present invention, a spring-loaded safety valve includes a valve-closing body. The valve-closing body has at least one valve-closing-body joint, in which at least one first closing-body lever is rotatably mounted. The first closing-body lever is rotatably connected via a further joint to a first support lever. The first support lever is rotatably mounted in at least one support-lever joint and in which the further joint is a spring-loaded sliding joint.

In accordance with another aspect of the invention, the valve-closing body is movable along a plain-bearing axis and the sliding joint is in operative connection with at least one spring, which, in a closing position of the valve-closing body, essentially exerts a preloading force, directed orthogonally to the plain-bearing axis, on the sliding joint for a closing movement of the safety valve.

According to a further aspect of the present invention, the at least one first closingbody lever, in the closing position of the valve-closing body, has a closing-body angle with the plain-bearing axis within an angular range of 25°–60°.

In accordance with an additional aspect of the present invention, the at least one first support lever, in the closing position of the valve-closing body, is oriented essentially parallel to the plain-bearing axis.

In accordance with a further aspect of the present invention, first and second closing-body levers and first and second support levers are provided, and are arranged in mirror image relative to a plain-bearing axis of the valve-closing body.

According to a further aspect of the present invention, the at least one support-lever joint is fastened to a rigid lever wall, which is oriented orthogonally relative to a plainbearing axis of the valve-closing body.

An advantage of the invention consists in the fact that the spring-loaded safety valve opens rapidly and reliably as soon as a pressure on the valve reaches a predeterminable preloading-force limit value.

Wide opening may be achieved with a spring stack having a flat spring characteristic and large stroke. Rapid opening requires a small mass of the moving parts. According to the invention, both requirements may be fulfilled at the same time, which is not possible with a directly acting spring assembly, e.g. having a disk or compression spring.

BRIEF DESCRIPTION OF THE DRAWINGS

The invention is explained below with reference to exemplary embodiments, in which.

DETAILED DESCRIPTION OF THE PREFERRED EMBODIMENTS

Figure 1:
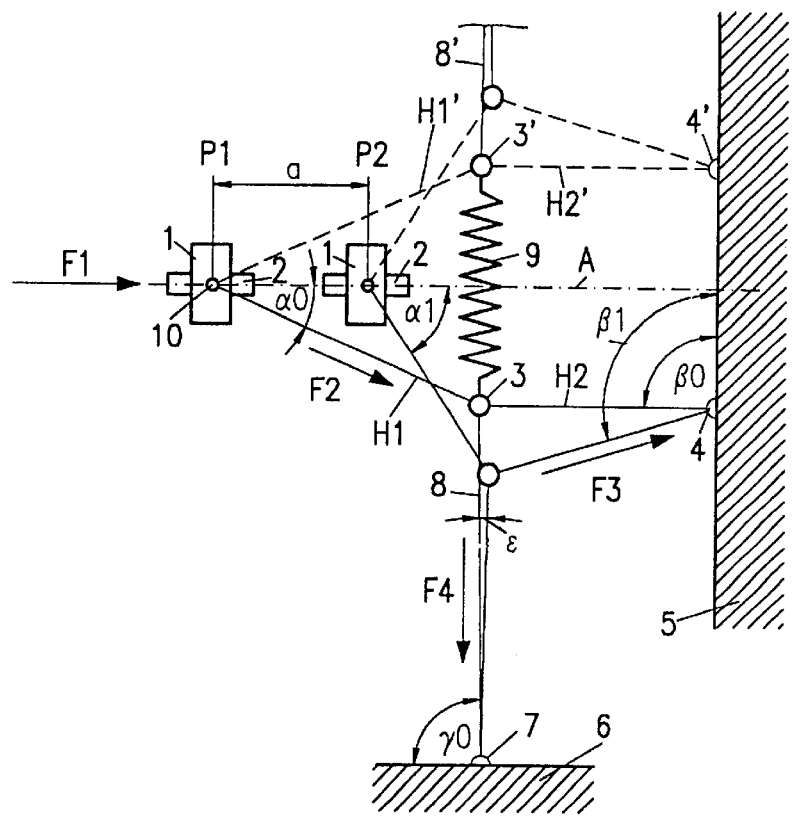
FIG. 1 shows a diagrammatic view of a spring-loaded safety valve with alternative variants.

The same parts are identified by the same reference numerals in the figures.

FIG. 1 schematically shows an automatically resetting spring-loaded safety valve having a valve shut-off device or a valve-closing body (1), which may be a valve cap or a valve cone or a valve disk or a valve cover for a valve body (not shown). This valve-closing body (1) is firmly connected to a plain bearing or axial plain bearing (2), which is displaceable along a valve axis or stroke axis or plain-bearing axis (A). In a valve-closing-body joint (10) perpendicular to the axis of symmetry (A), the valve-closing body (1) is connected in an articulated manner to a first closing-body lever (Hi), which is connected in an articulated manner via a first sliding joint (3) to a first support lever (H2) on the one hand and to a first compression spring (8) on the other hand. The first closing-body lever (H1), relative to the axis of symmetry (A), has an acute closing-body angle ($\alpha 0$) of 35° in a closing position (P1) of the valve-closing body (1) and, in the opening position (P2) of the latter displaced to the right by a stroke or valve stroke (a) along the plain-bearing axis (A), has an acute closing-body angle ($\alpha 1$) which is greater than $\alpha 0$. The first support lever (H2) is mounted in an articulated manner in a first support-lever joint (4), which is fastened to a rigid valve support or to a rigid lever wall (5). This lever wall (5) is oriented vertically to the plain-bearing axis (A). Relative to the lever wall (5), the first support lever (H2) has a lever-support angle (P0) of 90° in the closing position (P1) of the valve-closing body (1) and a larger lever-support angle ($\beta 1$) in the opening position of the latter. The first compression spring (8), in a spring-wall joint (7), is fastened in an articulated manner to a spring support or to a spring wall (6), which is oriented at right angles to the lever wall (5), and forms with this spring wall (6) a spring-support angle ($\gamma 0$) of 90° in the closing position (P1) of the valve-closing body (1). In the opening position (P2) of the valve-closing body (1), this spring-support angle ($\gamma 0$) increases by a stroke angle ($\epsilon$).

A valve-opening force (F1) acting on the valve-closing body (1) in the stroke direction of the valve-closing body (1) along the plain-bearing axis (A) transmits a closing-body-lever force (F2) to the first sliding joint (3) via the first closing-body lever (H1). The first sliding joint (3), on the one hand, transmits a support-lever force (F3) to the first support-lever joint (4) via the first support lever (H2) and, on the other hand, transmits a spring-compression force (F4) to the first compression spring (8). This first compression spring (8), due to its predetermined preloading, exerts a preloading force on the valve-closing body (1). In the closing position (P1) of the valve-closing body (1), this preloading force is set to a predeterminable preloading-force limit value ($F_G$)

The first closing-body lever (H1), the first sliding joint (3), the first support lever (H2) and the first support-lever joint (4) may be arranged in mirror image on the plain-bearing axis (A), as indicated by broken lines in FIG. 1. The corresponding components are additionally identified there by an apostrophe '.

The mirror-image arrangement may also be provided in addition to the arrangement not shown by broken lines. In this case, reference numeral (10) designates a valve-closing-body double joint. In this case, via a second sliding joint (3'), a second closing-body lever (H1'), on the one hand, is in rigid connection with a second support-lever joint (4') on the lever wall (5) via a second support lever (H2') and, on the other hand, is in compressive connection with a spring wall (6') (shown in FIG. 4) via a second compression spring (8').

Instead of or in addition to a first and/or second compression spring (8, 8') acting outward, at least one tension spring (9) acting inward may also be provided, and this tension spring (9) acts on the first and/or second sliding joint (3, 3').

Figure 2:
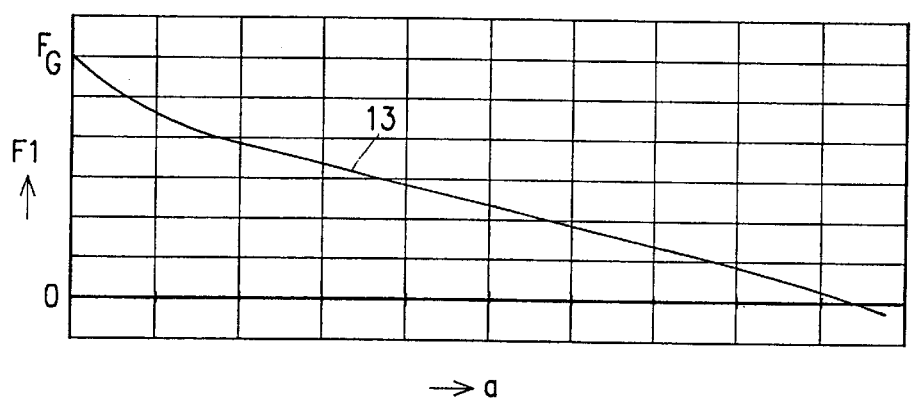
FIG. 2 shows a characteristic of the opening force of a spring-loaded safety valve as a function of a valve stroke.

Compression springs (8, 8') having a linear spring characteristic are combined with a lever arrangement (H1, H2; H1', H2') in a safety valve in such a way that a degressive spring characteristic (13) is obtained, cf. FIG. 2. There, the valve stroke (a) is plotted on the abscissa and the valve-opening force (F1) is plotted on the ordinate in arbitrary units. If the valve-opening force (F1) reaches a predeterminable preloading-force limit value ($F_G$), the safety valve opens. Given a suitable selection of the levers (H1, H2; H1', H2'), this means that the requisite valve-opening force on the valve-closing body (1) need not increase over the stroke (a), but rather a decrease is even possible. The levers (H1, H2; H1', H2') and compression springs (8, 8') are combined with one another in such a way that, depending on the valve stroke (a), the compression springs (8, 8') apply sufficient force to the valve-closing body (1) only when the pressure on the valve-closing body (1) falls sharply, so that the safety valve closes again and the original preloading force is applied.

By a suitable lever transmission, all the requirements can be fulfilled at the same time:
1. To apply the requisite preloading force, a weaker compression spring may be used in the lever arrangement (H1, H2; H1', H2'), a factor which leads to a reduction in the mass of the moving part of the safety valve. In addition, the path which the moving mass has to cover is reduced.
2. The lever transmission may be selected in such a way that the stroke at the first or second compression spring (8, 8') is smaller than the valve stroke (a) at the valve-closing body (1), a factor which permits compression springs (8, 8') having a smaller stroke. This in turn leads to a reduction in the moving mass.
3. Due to the lever transmission, no increase in the pressure at the valve-closing body (1) is required over the valve stroke (a).

Figure 3:
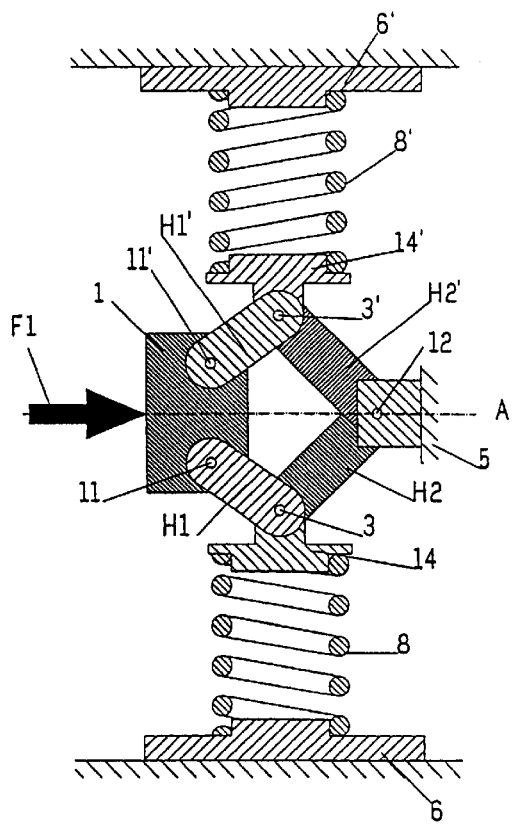
FIG. 3 shows a spring-loaded safety valve with a common wall-lever articulation point in an axially symmetrical embodiment in cross section.

FIG. 3 schematically shows an axially symmetrical, spring-loaded safety valve in a cross-sectional representation. The first and second closing-body levers (H1, H1') are connected in an articulated manner to the valve-closing body (1) in first and second valve-closing-body joints (11, 11') respectively at a distance from one another. The first and second support levers (H2, H2') are connected in an articulated manner to one another and to the lever wall (5) in a support-lever double joint (12) fastened to the lever wall (5). First and second compression springs (8, 8') designed as helical springs are connected in an articulated manner via first and second spring supports (14, 14') respectively to first and second sliding joints (3, 3') respectively, via which the levers (H1, H2) and (H1', H2') respectively are also in operative connection with one another in an articulated manner.

Figure 4:
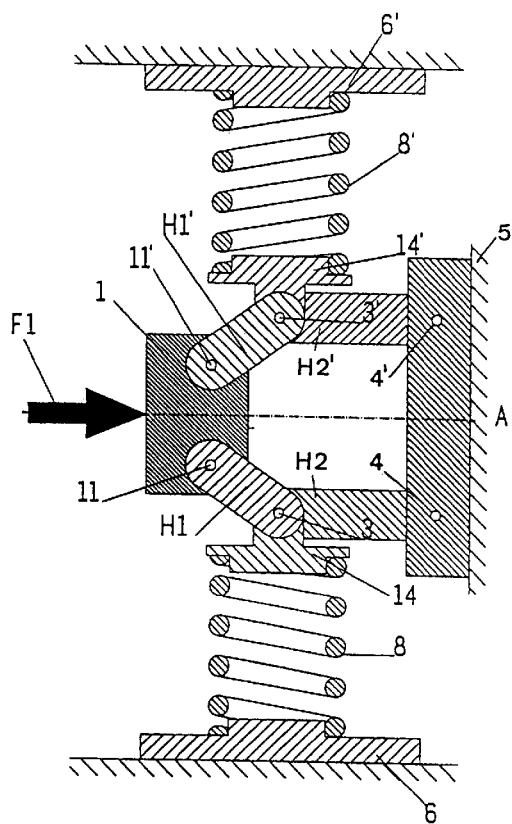
FIG. 4 shows a spring-loaded safety valve with different lever articulation points in an axially symmetrical embodiment in cross section.

In a further embodiment variant of the invention, FIG. 4 shows an axially symmetrical, spring-loaded safety valve in a cross-sectional representation. In this case, the first and second closing-body levers (H1, H1') are connected in an articulated manner to the valve-closing body (1) in first and second valve-closing-body joints (11, 11'), respectively, at a distance from one another, in accordance with FIG. 3. The first and second support levers (H2, H2') are connected in an articulated manner to the lever wall (5) in first and second support-lever joints (4, 4'), respectively, in accordance with FIG. 1.

In order to obtain as small an initial force (F4) as possible on the first and second compression springs (8, 8'), respectively, the spring-support angle ($\gamma 0$) and the lever-support angle ($\beta 0$) should in each case be at least approximately 90° and the closing-body angle ($\alpha 0$) should be selected to be as small as possible. The closing-body angle ($\alpha 0$) is preferably selected within the angular range of 25°–60°, at a length of the first and second closing-body levers (H1, H1') of 50 mm and a length of the first and second support levers (H2, H2') of 60 mm.

What is claimed is:
1. A spring-loaded safety valve comprising:
   a valve-closing body, having at least one valve-closing-body joint, in which at least one first closing-body lever is rotatably mounted, said at least one first closing-body lever being rotatably connected through a further joint to a first support lever, said first support lever being rotatably mounted in at least one support-lever joint, wherein the further joint is a spring-loaded sliding joint;
   said valve-closing body is movable along a plain-bearing axis;
   said sliding joint is in operative connection with at least one spring, which, in a closing position of the valve-closing body, essentially exerts a preloading force, directed orthogonally to the plain-bearing axis, on the sliding joint for a closing movement of the safety valve; and
   wherein the at least one first closing-body lever, in the closing position of the valve-closing body, has a closing-body angle with the plain-bearing axis within an angular range of 25°–60°.
2. The spring-loaded safety valve as claimed in claim 1, wherein the at least one support-lever joint is fastened to a rigid lever wall, which is oriented orthogonally relative to a plain-bearing axis of the valve-closing body.
3. A spring-loaded safety valve comprising:
   a valve-closing body, having at least one valve-closing-body joint, in which at least one first closing-body lever is rotatably mounted, said at least one first closing-body lever being rotatably connected through a further joint to at least one first support lever, said first support lever being rotatably mounted in at least one support-lever joint, wherein the further joint is a spring-loaded sliding joint;

said valve-closing body is movable along a plain-bearing axis;

said sliding joint is in operative connection with at least one spring, which, in a closing position of the valve-closing body, essentially exerts a preloading force, directed orthogonally to the plain-bearing axis, on the sliding joint for a closing movement of the safety valve; and wherein the at least one first support lever, in the closing position of the valve-closing body, is oriented essentially parallel to the plain-bearing axis.

4. The spring-loaded safety valve as claimed in claim 3, wherein the at least one support-lever joint is fastened to a rigid lever wall, which is oriented orthogonally relative to a plain-bearing axis of the valve-closing body.

5. A spring-loaded safety valve comprising:

a valve-closing body, having at least one valve-closing-body joint, in which at least one first closing-body lever is rotatably mounted, said at least one first closing-body lever being rotatably connected through a further joint to a first support lever, said first support lever being rotatably mounted in at least one support-lever joint, wherein the further joint is a spring-loaded sliding joint; and wherein first and second closing-body levers and first and second support levers are provided, said first and second closing-body levers and said first and second support levers being arranged in mirror image relative to a plain-bearing axis of the valve-closing body.

6. The spring-loaded safety valve as claimed in claim 1, wherein the at least one support-lever joint is fastened to a rigid lever wall, which is oriented orthogonally relative to a plain-bearing axis of the valve-closing body.

* * * * *